United States Patent [19]

Itoh et al.

[11] Patent Number: 5,732,807

[45] Date of Patent: Mar. 31, 1998

[54] POWER TRANSMISSION DEVICE

[75] Inventors: Kenichiro Itoh, Shizuoka; Ken Yamamoto; Isao Hori, both of Iwata, all of Japan

[73] Assignee: NTN Corporation, Osaka, Japan

[21] Appl. No.: 592,880

[22] Filed: Jan. 24, 1996

[30] Foreign Application Priority Data

Jan. 26, 1995 [JP] Japan ..................... 7-011028
Feb. 28, 1995 [JP] Japan ..................... 7-040688

[51] Int. Cl.$^6$ ............................. B60K 23/08
[52] U.S. Cl. ................. 192/38; 192/37; 192/45.1; 192/47; 192/48.6
[58] Field of Search .................. 192/48.6, 48.92, 192/45.1, 47, 50, 49, 37, 38, 48.9; 180/248; 475/231, 237

[56] References Cited

U.S. PATENT DOCUMENTS

| | | | |
|---|---|---|---|
| 2,041,445 | 5/1936 | Warren | 192/48.6 |
| 2,079,527 | 5/1937 | Rauen | 192/48.6 X |
| 2,403,378 | 7/1946 | Kilpela | 192/48.6 X |
| 3,123,169 | 3/1964 | Young et al. | 192/38 X |
| 3,300,002 | 1/1967 | Roper | 192/38 X |
| 3,437,186 | 4/1969 | Roper | 192/38 X |
| 4,212,557 | 7/1980 | Overbeek | 192/38 X |
| 5,103,690 | 4/1992 | Macpherson et al. | 192/50 X |
| 5,286,239 | 2/1994 | Ito et al. | 192/50 X |
| 5,355,748 | 10/1994 | Ito et al. | 192/38 X |
| 5,529,158 | 6/1996 | Itoh et al. | 192/45.1 X |
| 5,542,514 | 8/1996 | Itoh et al. | 192/48.6 X |

Primary Examiner—Rodney H. Bonck
Attorney, Agent, or Firm—Wenderoth, Lind, Ponack

[57] ABSTRACT

An automotive power transmission device which can change over the driving mode between two-wheel drive and four-wheel drive mode. The device when combined with a differential as an integral unit can be assembled easily. This device includes an axle made up of axially separated first and second portions, a differential coupled to one end of the first portion of the axle and having a differential cover, and a clutch device coupled to the other end of the first portion of the axle which is enclosed in the differential cover. The clutch includes an inner ring connected to the differential, an outer ring connected to a vehicle wheel and rotatably mounted around the inner ring, sprags and cages mounted between the inner and outer rings, a biasing member for biasing and rotating the cages relative to the inner ring, and a locking system for detachably coupling the cage and the outer ring together. While the transfer is set in the two-wheel drive mode, the outer ring is allowed to free-run. During the four-wheel drive mode, the rotation of the axle is transmitted to the wheels through the inner ring, sprags and outer ring.

7 Claims, 19 Drawing Sheets

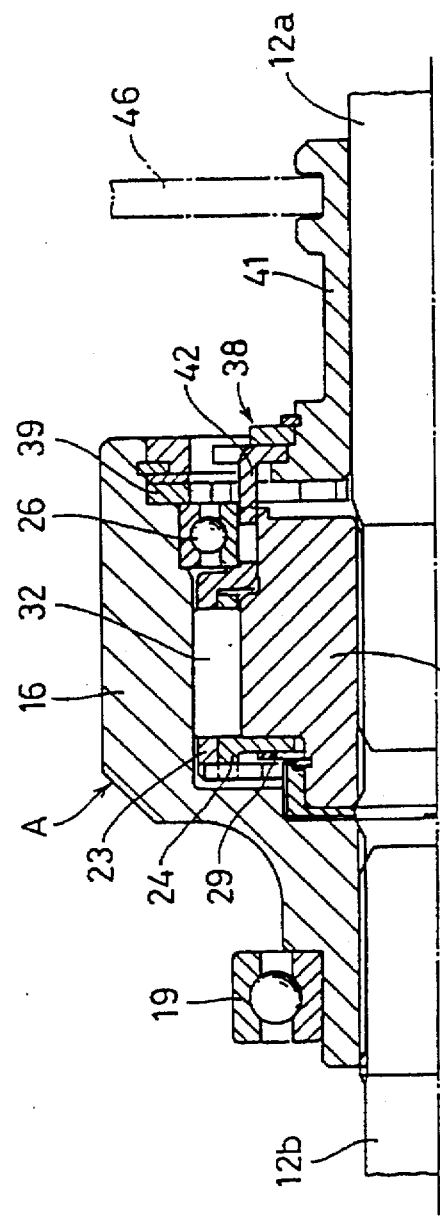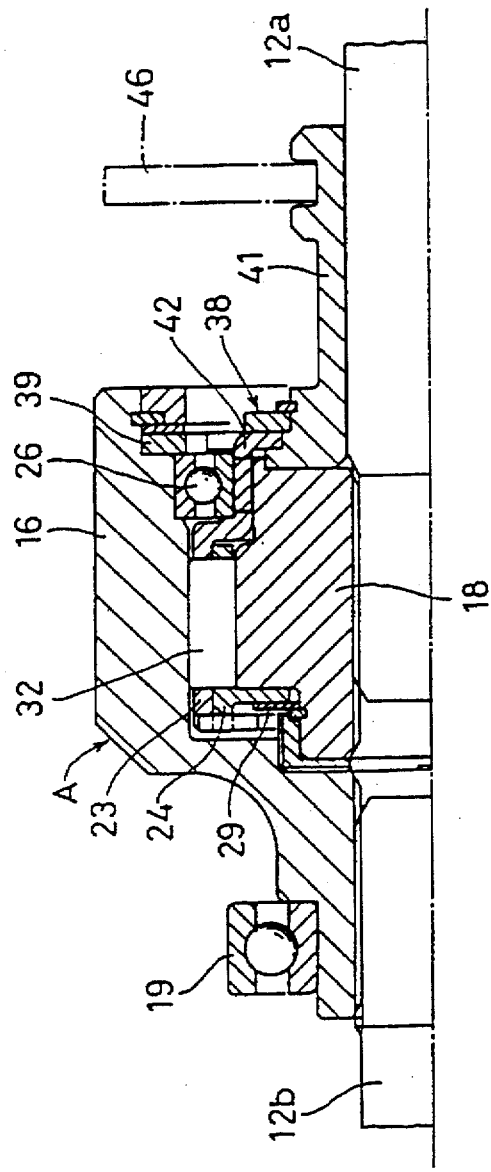

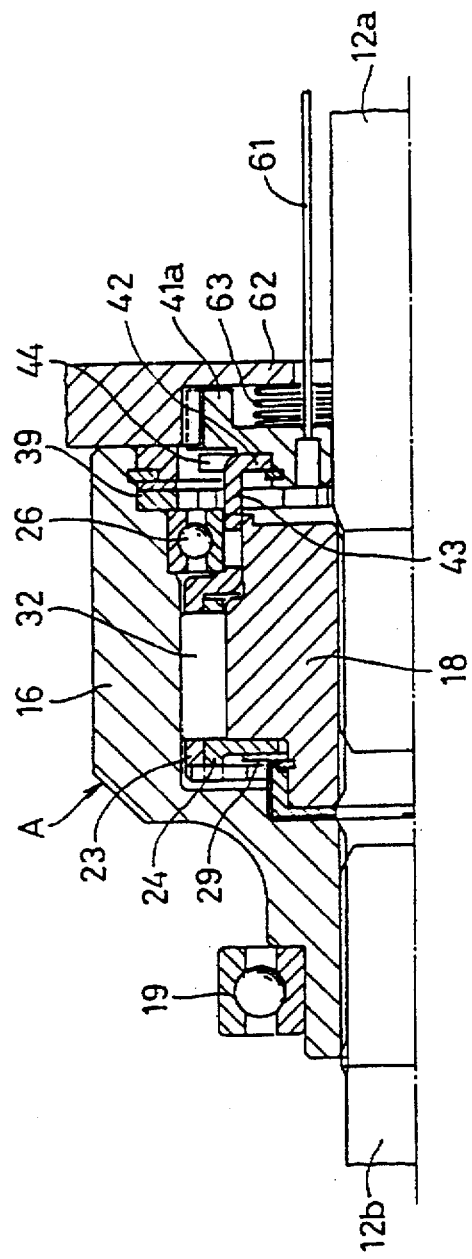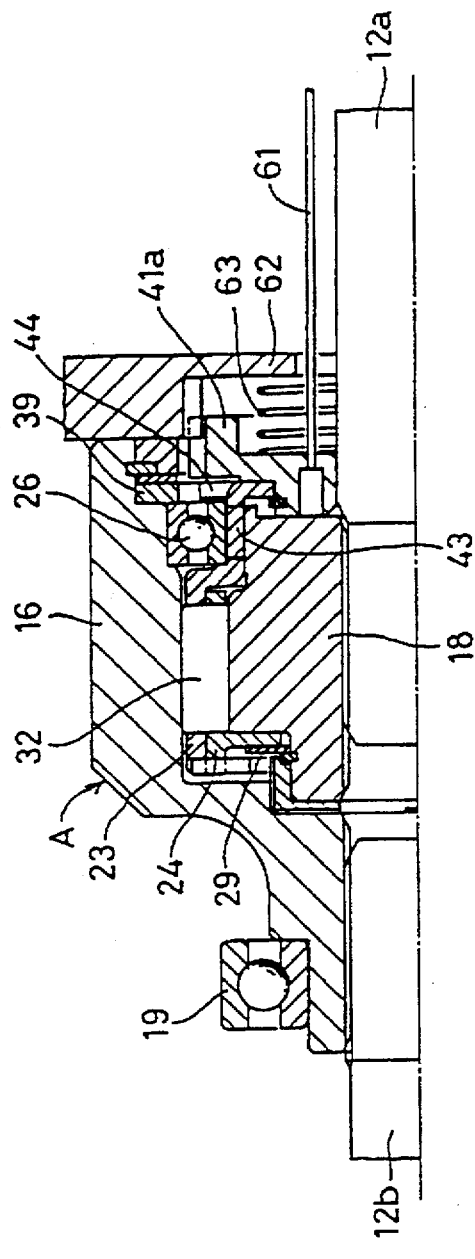

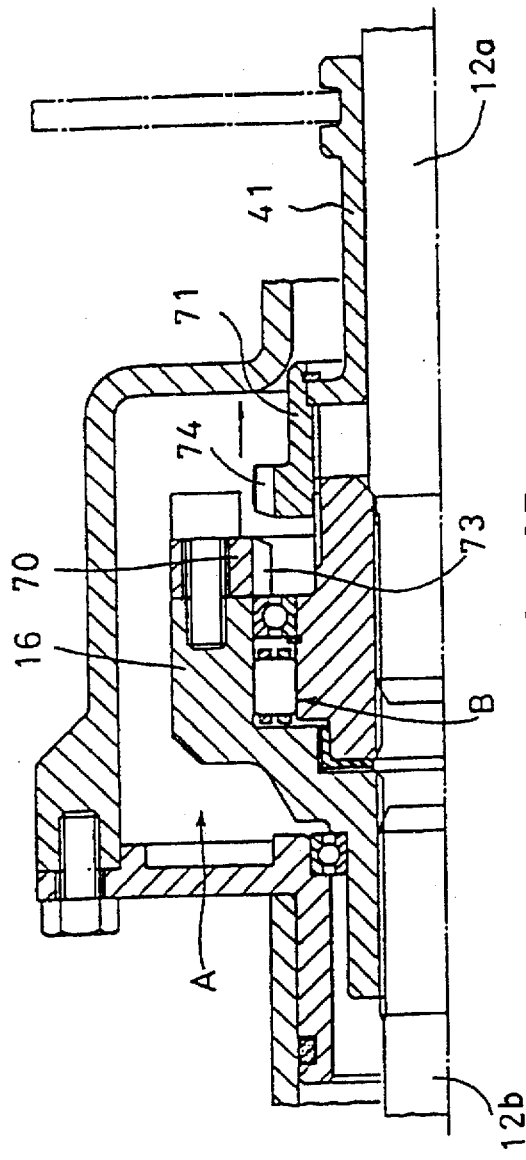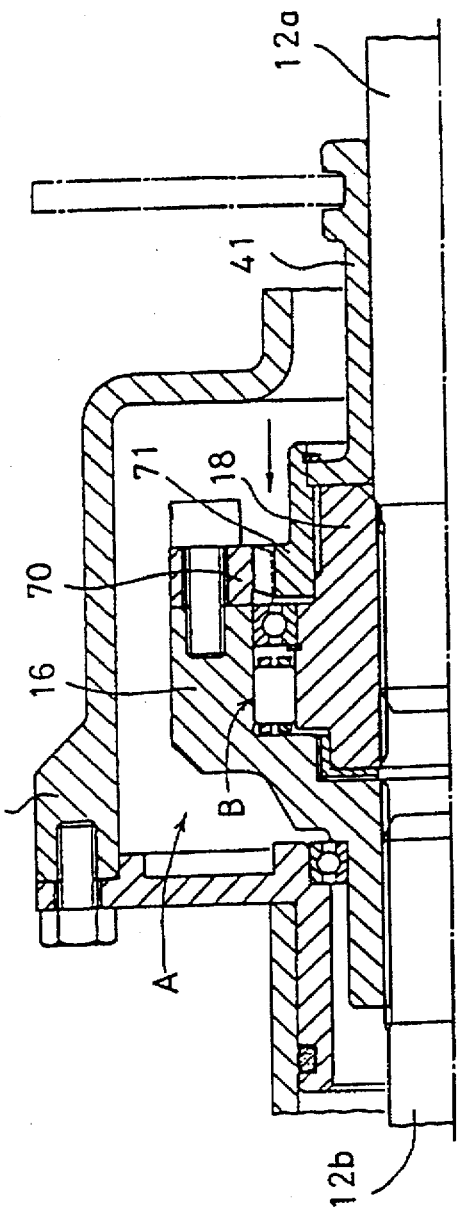

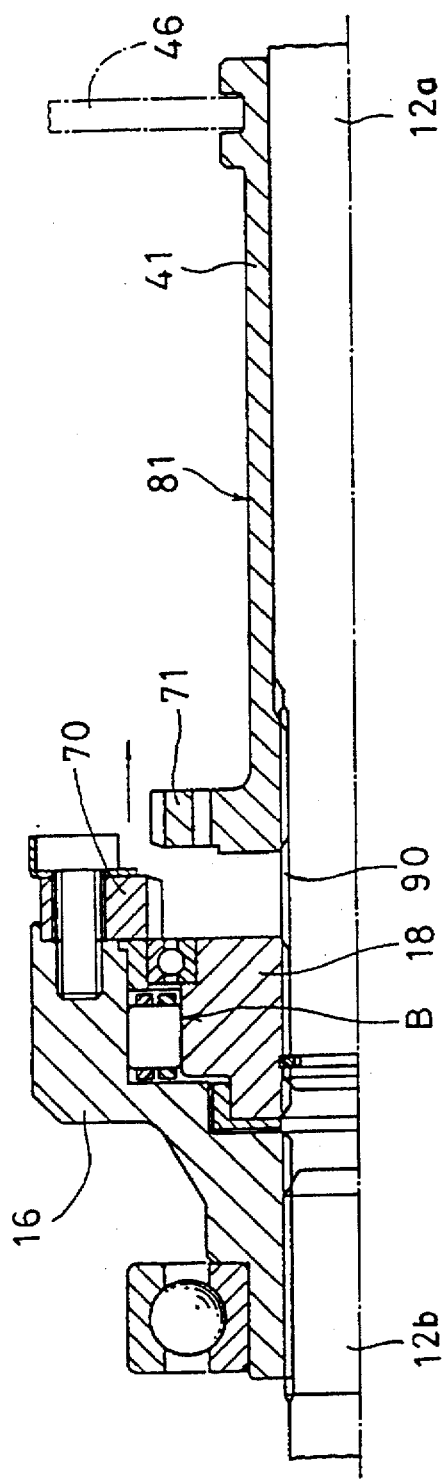
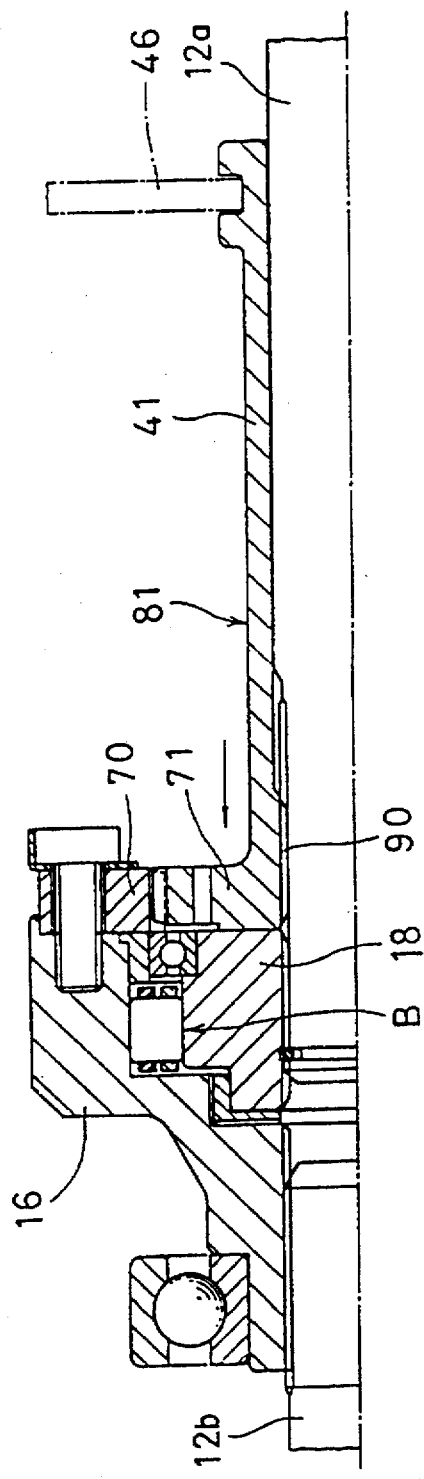
FIG. 21A
FIG. 21B

POWER TRANSMISSION DEVICE

BACKGROUND OF THE INVENTION

This invention relates to a power transmission device provided in a line between a differential and one of two wheels of a four-wheel drive vehicle and adapted to selectively transmit and cut off the driving force to these two wheels.

Some part-time 4WD vehicles of the type whose rear wheels are main driving wheels have hub clutches mounted between the front wheel hubs and the front axles. The driving force is selectively transmitted to the front wheels, or not, by engaging and disengaging the hub clutches to change the driving mode over between two-wheel drive and four-wheel drive.

Some of these conventional hub clutches are automatically controlled, while others are manually controlled. Either type has only the function of selectively coupling and decoupling the axles to the wheel hubs.

Namely, conventional hub clutches are used to couple and decouple axles to wheel hubs by moving a slide gear mounted on the axles into and out of engagement with the wheel hubs by activating e.g. a cam mechanism operatively linked to the axles. While the hub clutches are in engagement, the car is driven in a four-wheel mode with the axles coupled to the wheel hubs.

If the car begins to turn a tight corner in this state, the rear wheels tend to slip because they travel a shorter distance than the front wheels. Thus, a kind of braking force acts on the car. Because of this braking phenomenon, it is practically impossible to drive conventional part-time 4WD cars of this type in four-wheel drive on a paved road.

Thus, it is necessary for the driver of this type of car to disengage the hub clutches every time the car is moving from an unpaved road onto a paved road. Engaging and disengaging the hub clutches is, however, troublesome, to say the least.

Also, such hub clutches, mounted between wheel axles and wheel hubs, are separate members from the differential and thus require a long time and a lot of labor to assemble and mount them on the car.

SUMMARY OF THE INVENTION

An object of this invention is to provide an automotive power transmission device which can change a driving mode over between a two-wheel drive mode in which the front wheel drive train is disengaged from the engine and a four-wheel drive mode in which all four vehicle wheels are interlocked, which never causes braking phenomena while the car is turning a tight corner, and which, combined with the differential as a unit, facilitates the assembly of a vehicle.

According to this invention, there is provided a power transmission device comprising an axle having first and second portions axially separated, a differential coupled to one end of the first portion of the axle, and a clutch coupled to the other end of the first portion of the axle. The second portion of the axle has one end thereof coupled to the clutch and the other end to a vehicle wheel. The clutch comprise a driving member fixed to the first portion of the axle and a driven member fixed to the second portion of the axle. A remote-control means is for remote-controlling the coupling between the driving member and the driven member. The clutch transmits torque while the first portion is rotating faster than the second portion and otherwise permits free-running of the first and second portions.

While the vehicle is running with the power transmission device according to this invention mounted between the differential and the wheel at the driven side and with the engaging element disengaged, the one-way clutch runs free, not transmitting the driving force from the wheel to the differential. Thus the driving path from differential at the driven side to the transfer is inoperative.

When the engaging elements are engaged, the differential is coupled to the wheel, and now 4-wheel drive will start.

In the transfer from 2-wheel drive to four-wheel drive, the engaging elements will operate smoothly because the speed of the axle portion at the differential side is controlled to be not higher than that of the axle portion at the wheel side.

If the engaging member and the one-way clutch are housed in a differential cover, the power transmission device can be treated integrally with the differential. This makes the assembly of the vehicle easy.

BRIEF DESCRIPTION OF THE DRAWINGS

Other features and objects of the present invention will become apparent from the following description made with reference to the accompanying drawings, in which:

FIG. 5A is a sectional view of a locking means of the clutch device showing an unlocking position;

FIG. 5B is a vertical sectional view showing a locking position;

FIGS. 12A and 12B are similar views of still another type of locking means;

FIG. 16A is a sectional view of a 2-wheel drive mode;

FIG. 16B is a similar view of a 4-wheel drive mode;

FIGS. 21A and 21B are vertical sectional views of a fourth embodiment; and

DETAILED DESCRIPTION OF THE PREFERRED EMBODIMENT

Embodiments of this invention are now described with reference to the accompanying drawings.

Figure 1:
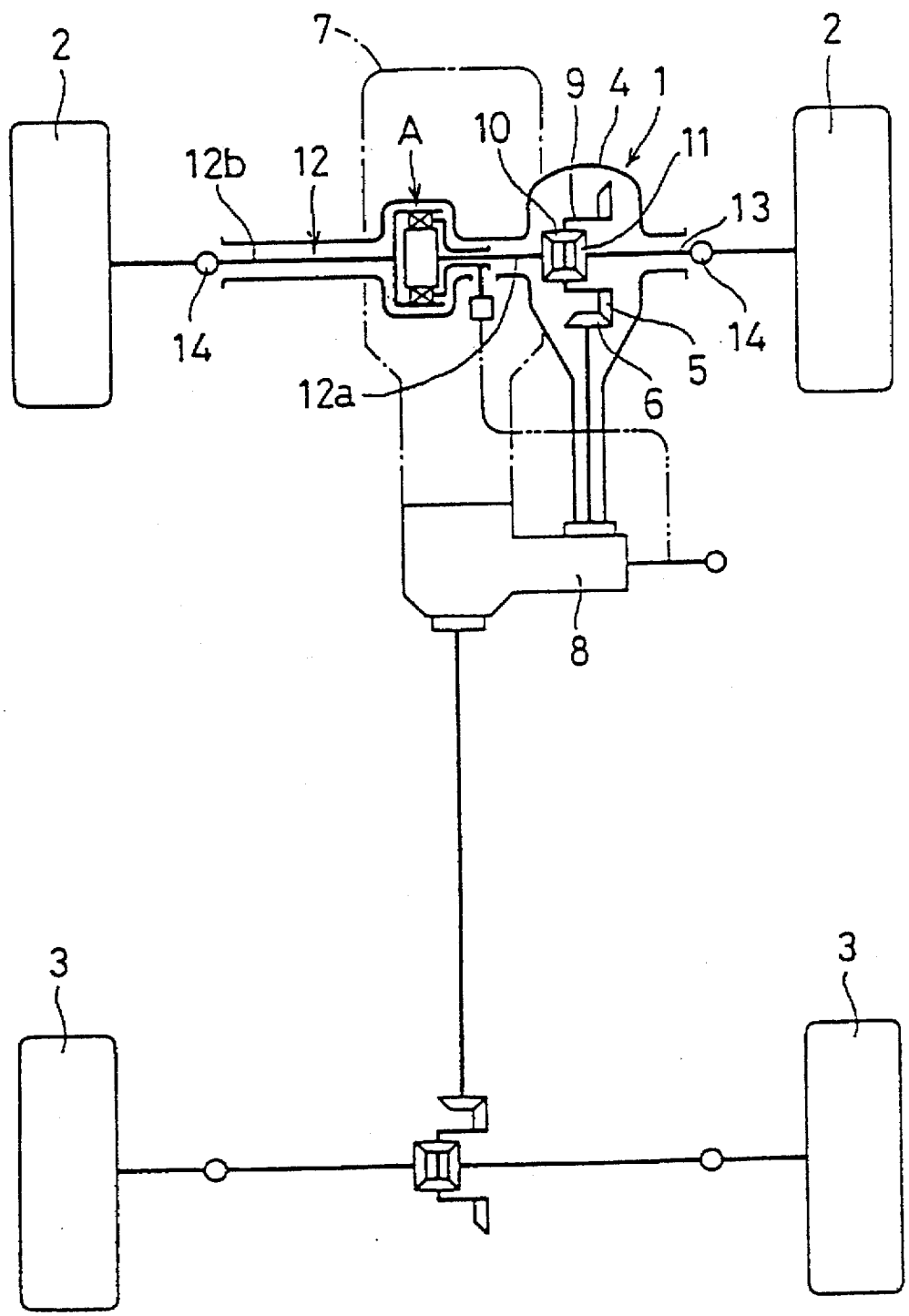
FIG. 1 is a plan view of a wheel drive train of a four-wheel drive vehicle.

FIG. 1 shows a power train of a four-wheel drive vehicle of a type driven mainly by the rear wheels. In the figure, numeral 1 designates a front differential, 2 front wheels, and 3 rear wheels.

The front differential 1 comprises a differential case 9 rotatably mounted in a differential cover 4 and coupled to an engine 7 through a ring gear 5 and a drive pinion 6 and through a transfer 8. Pinion gears 10 are coupled so as to be rotatable with the differential case 9 and a pair of side gears 11 which mesh with the pinion gears 10. Front wheel driving axles 12 and 13 are connected to the respective side gears 11.

Figure 2:
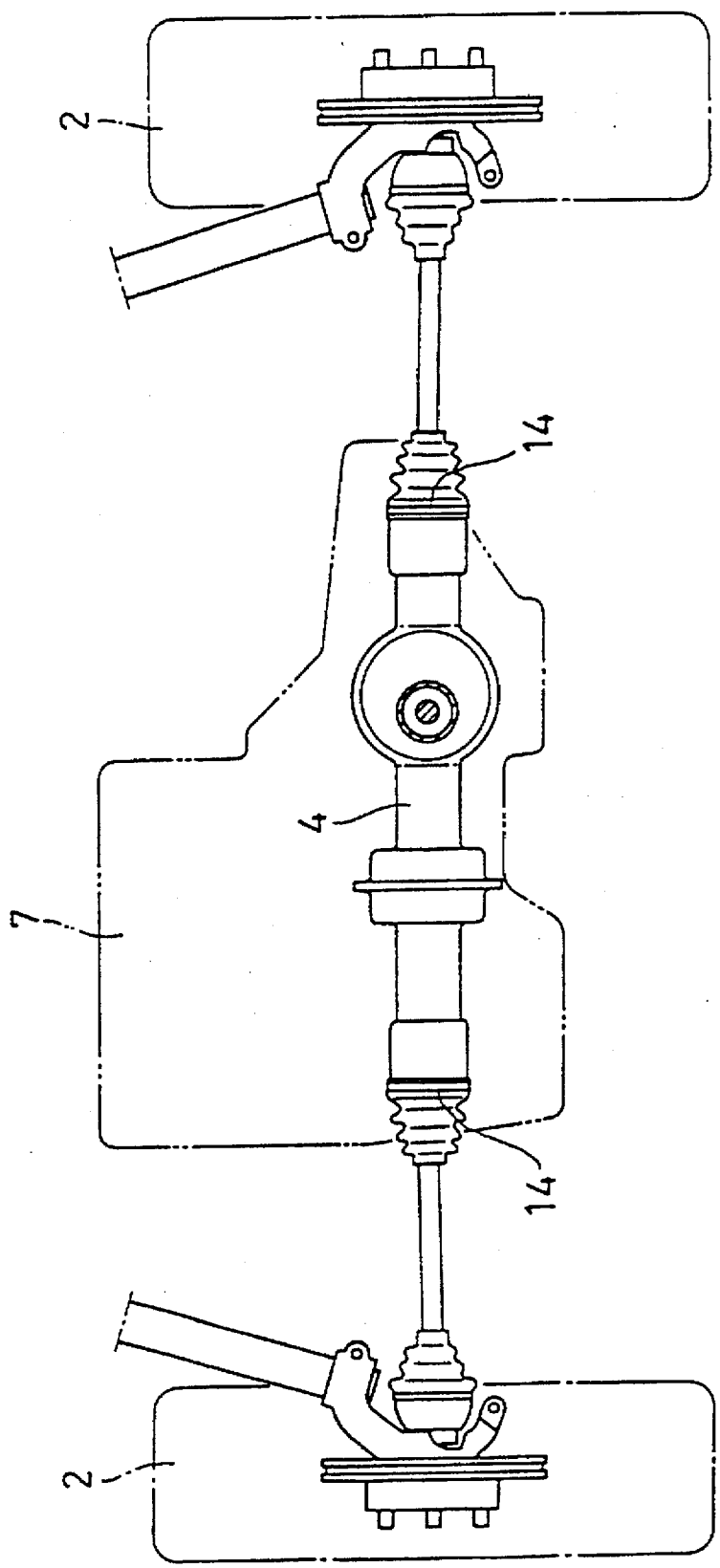
FIG. 2 is a vertical sectional view of a front wheel drive train of the wheel drive train of FIG. 1.
Figure 3:
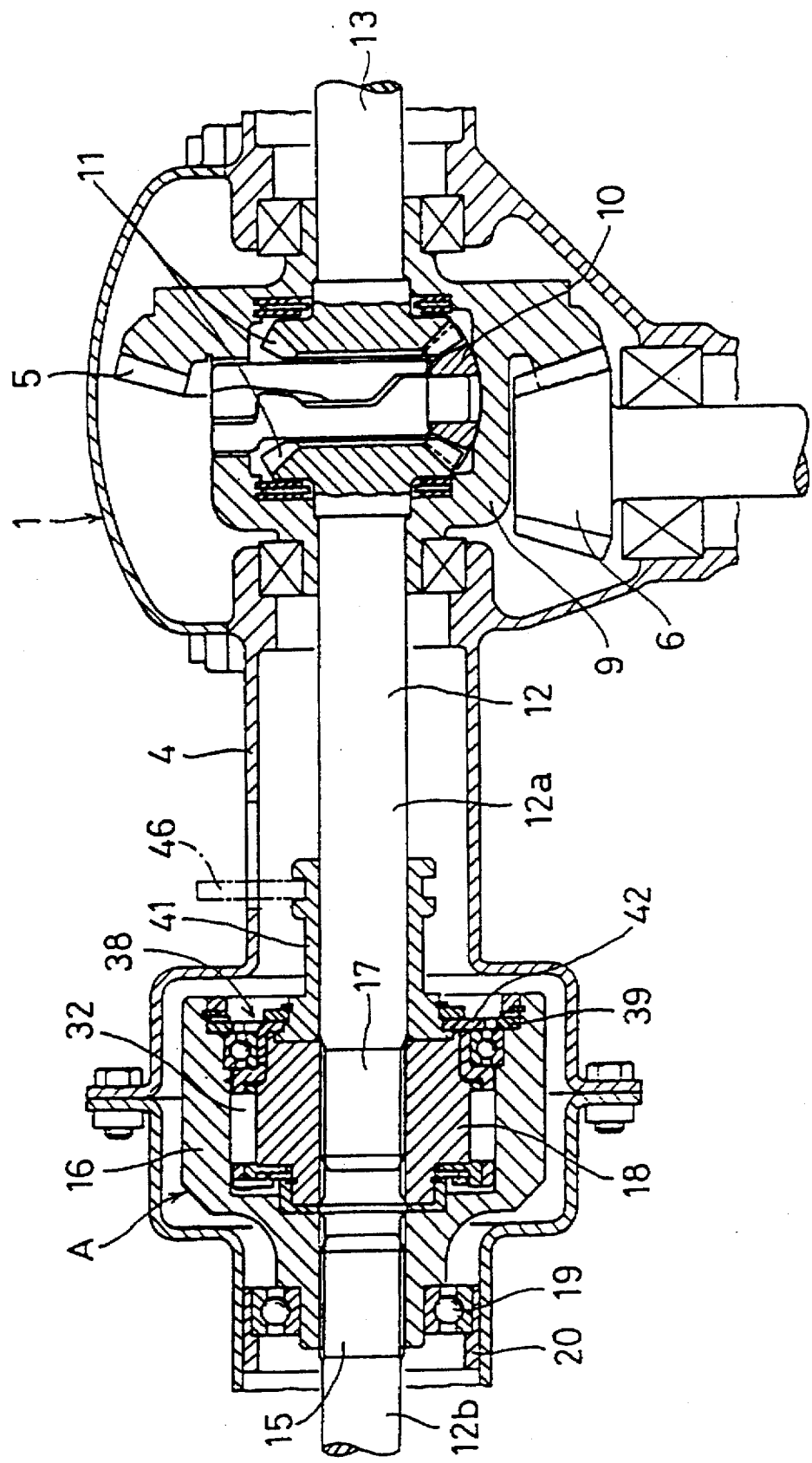
FIG. 3 is a plan view in cross-section of a power transmission device according to this invention as mounted in the front wheel drive train of FIG. 2.

As shown in FIGS. 1 and 2, the shorter axle 13 is connected to one of the front wheels 2 through a homokinetic joint 14.

The longer axle 12 is enclosed in the differential cover 4 and comprises two axially aligned, axle portions 12a and 12b which are joined together through a clutch device A disposed in the differential cover 4. The outer axle portion 12b is connected to the other front wheel 2 through a homokinetic joint 14.

FIGS. 3 through 10 shows one embodiment of the clutch device A. It has an outer ring 16 as a driven member coupled to the outer axle portion 12b through a spline 15, and an inner ring 18 as a driving member coupled to the inner axle portion 12a through a spline 17. The outer ring 16 is rotatably supported on the differential cover 4 through a bearing 19 and a sleeve 20. The inner ring 18, provided inside the outer ring 16, is rotatable relative to the outer ring 16.

Figure 7:
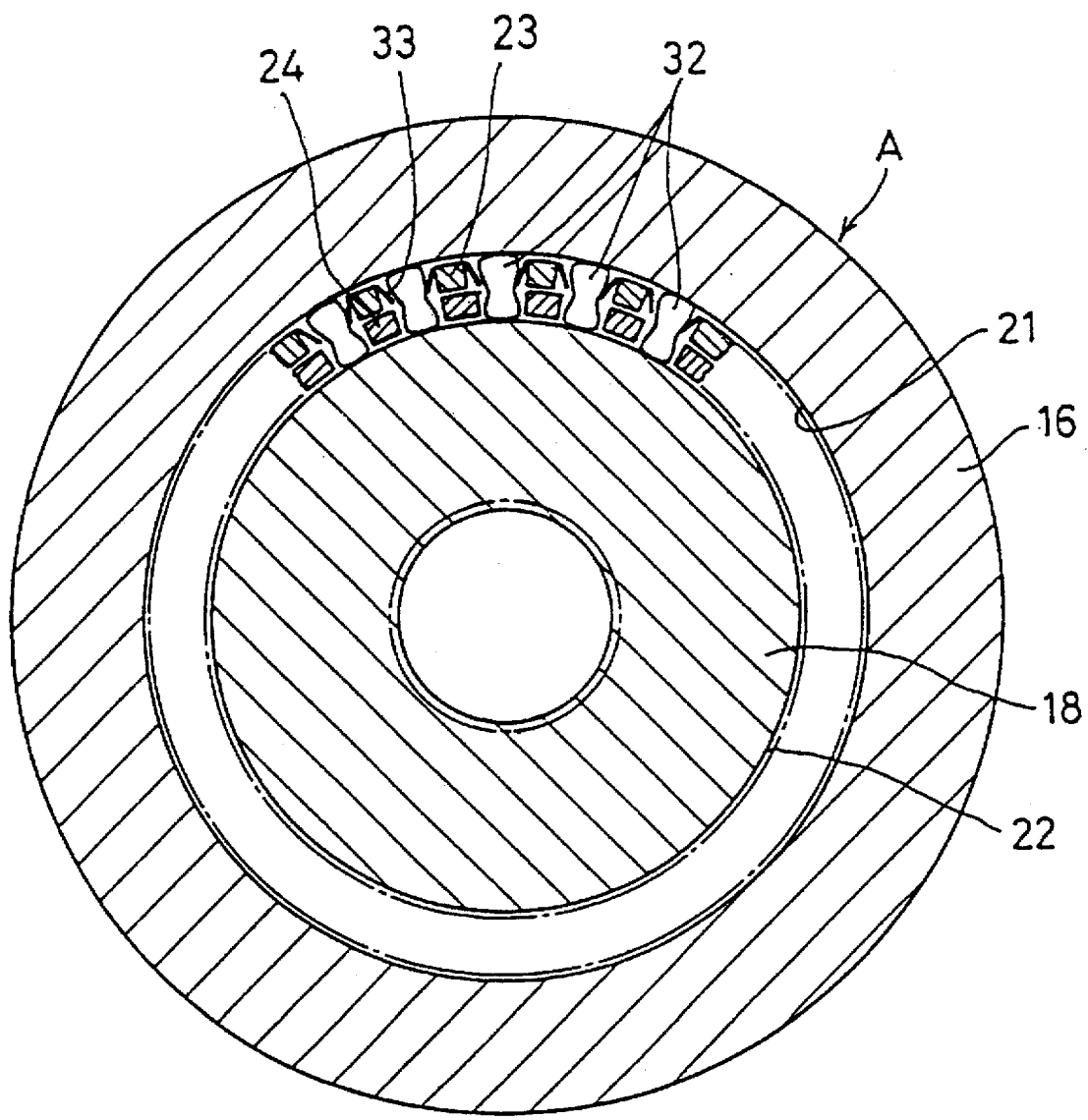
FIG. 7 is a sectional view taken along arrow VII—VII of FIG. 4.
Figure 9:
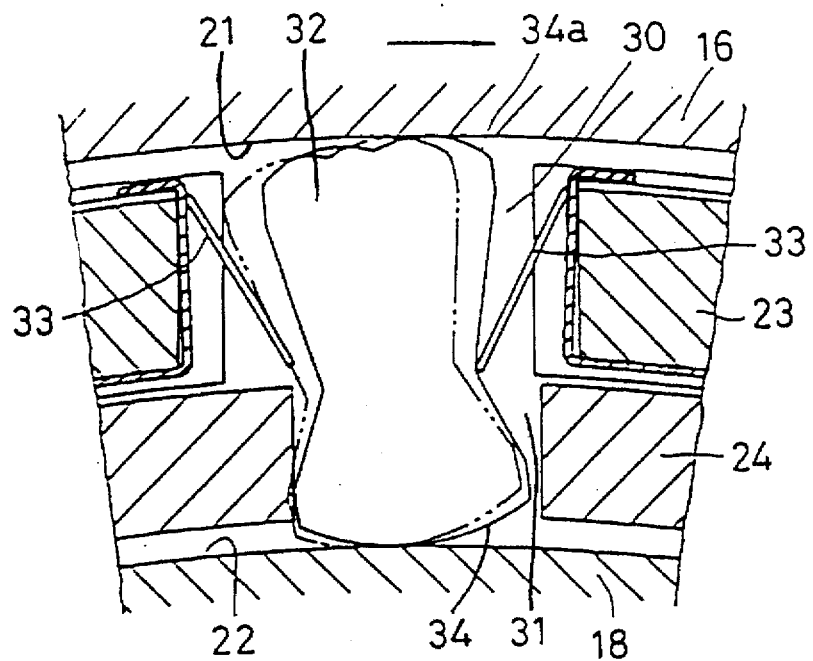
FIG. 9 is a sectional view of a sprag showing an engaged position and free-running position while the car is traveling forward.
Figure 10:
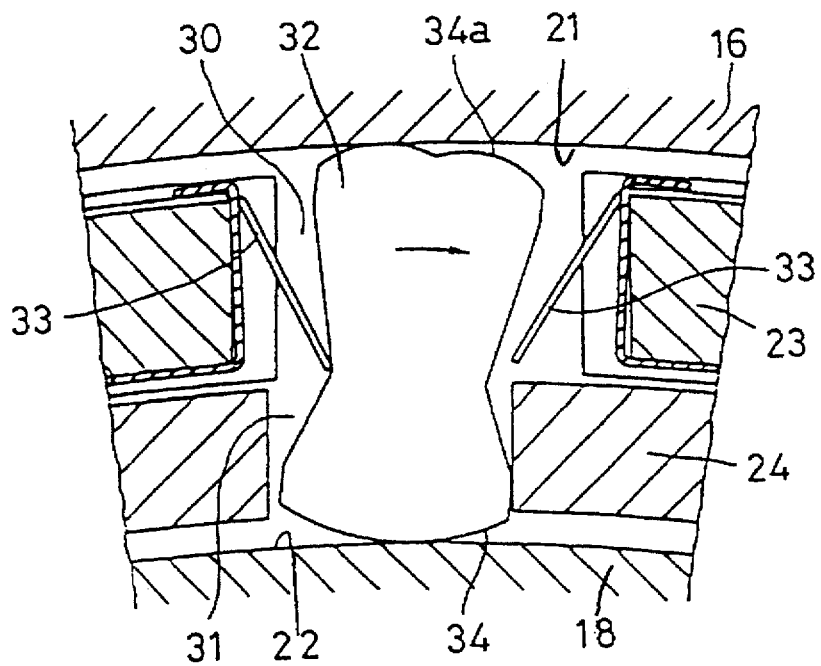
FIG. 10 is a sectional view of a sprag showing an engaged position and a free-running position while the car is backing.

As shown in FIGS. 7 and 9, cylindrical surfaces 21 and 22 are formed on the inner periphery of the outer ring 16 and the outer periphery of the inner ring 18, respectively. A large-diameter cage 23 and a small-diameter cage 24 are mounted between the cylindrical surfaces 21 and 22.

Figure 4:
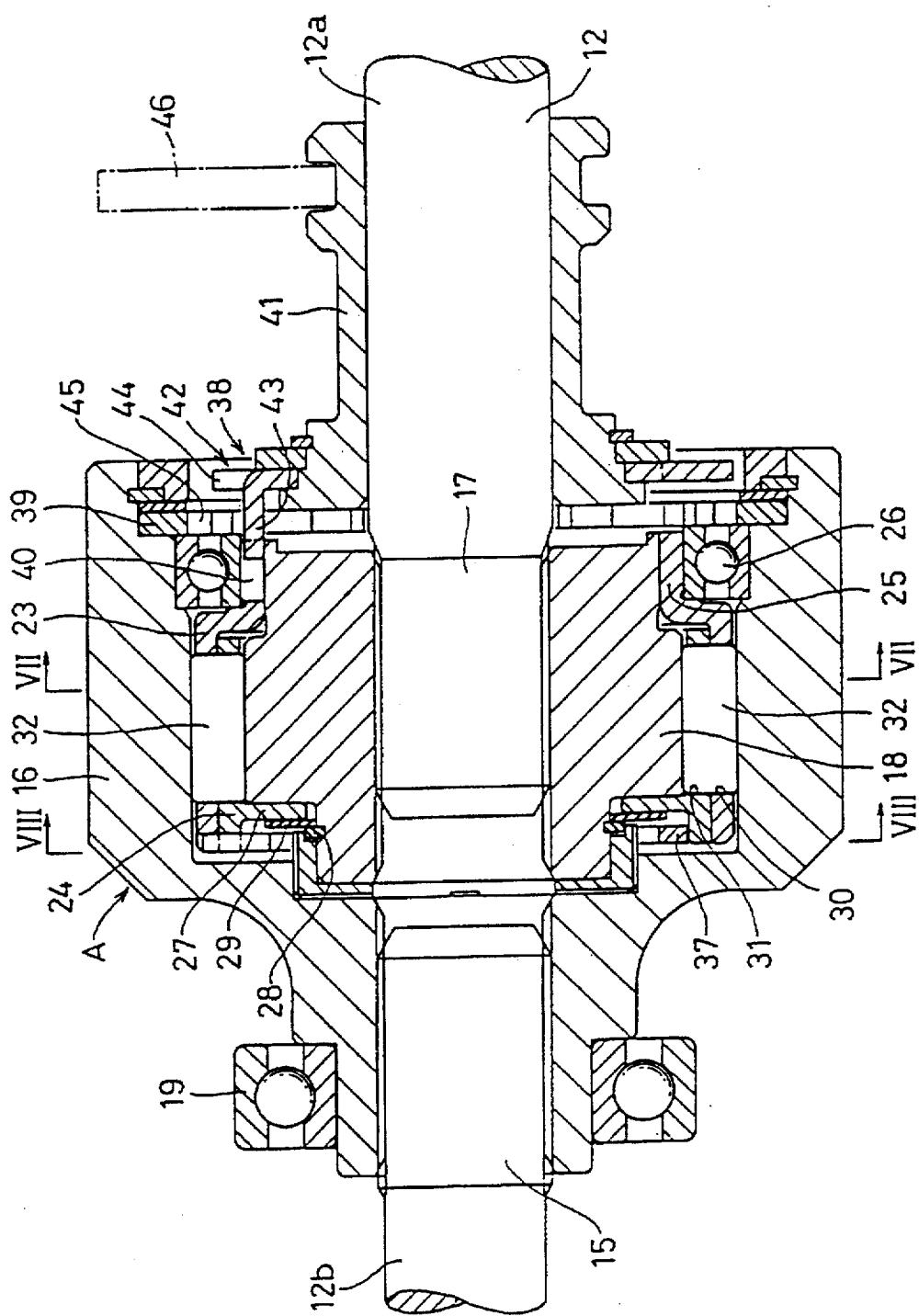
FIG. 4 is an enlarged sectional view of a clutch device of the power transmission device of FIG. 3.

As shown in FIG. 4, the large-diameter cage 23 has an integral rear arm 25. It is guided by a bearing 26 so as to be rotatable relative to the outer ring 16 and the inner ring 18.

The small-diameter cage 24 has a front bent portion 27 extending radially inwardly and in sliding contact with one end face of the inner ring 18. A cone spring acting as a pressure spring 29 is disposed between the bent portion 27 and a snap ring 28. It presses the bent portion 27 against the end face of the inner ring 18. The small-diameter cage 24 is thus coupled to the inner ring 18 due to the friction produced between the bent portion 27 and the inner ring 18.

As shown in FIGS. 7 and 9, a plurality of pockets 30 and 31 are formed in the cylindrical portions of the large-diameter cage 23 and the small-diameter cage 24, respectively. An engaging element or sprag 32 and springs 33 for retaining the sprag 32 are received in each pair of pockets 30 and 31.

Each sprag 32 has symmetrical inner and outer arcuate surfaces 34 and 34a having centers of curvature at different points. When the sprags 32 are inclined in either direction by a predetermined angle, they come into wedging engagement with the cylindrical surfaces 21 and 22, thereby interlocking the outer ring 16 and the inner ring 18. The springs 33, having one end thereof supported on the large-diameter cage 23, bias the sprags 32 from both sides, keeping them in engagement with the cylindrical surfaces 21 and 22. The large-diameter cage 23, small-diameter cage 24 and sprags 32 function in cooperation as a two-way clutch.

Figure 8:
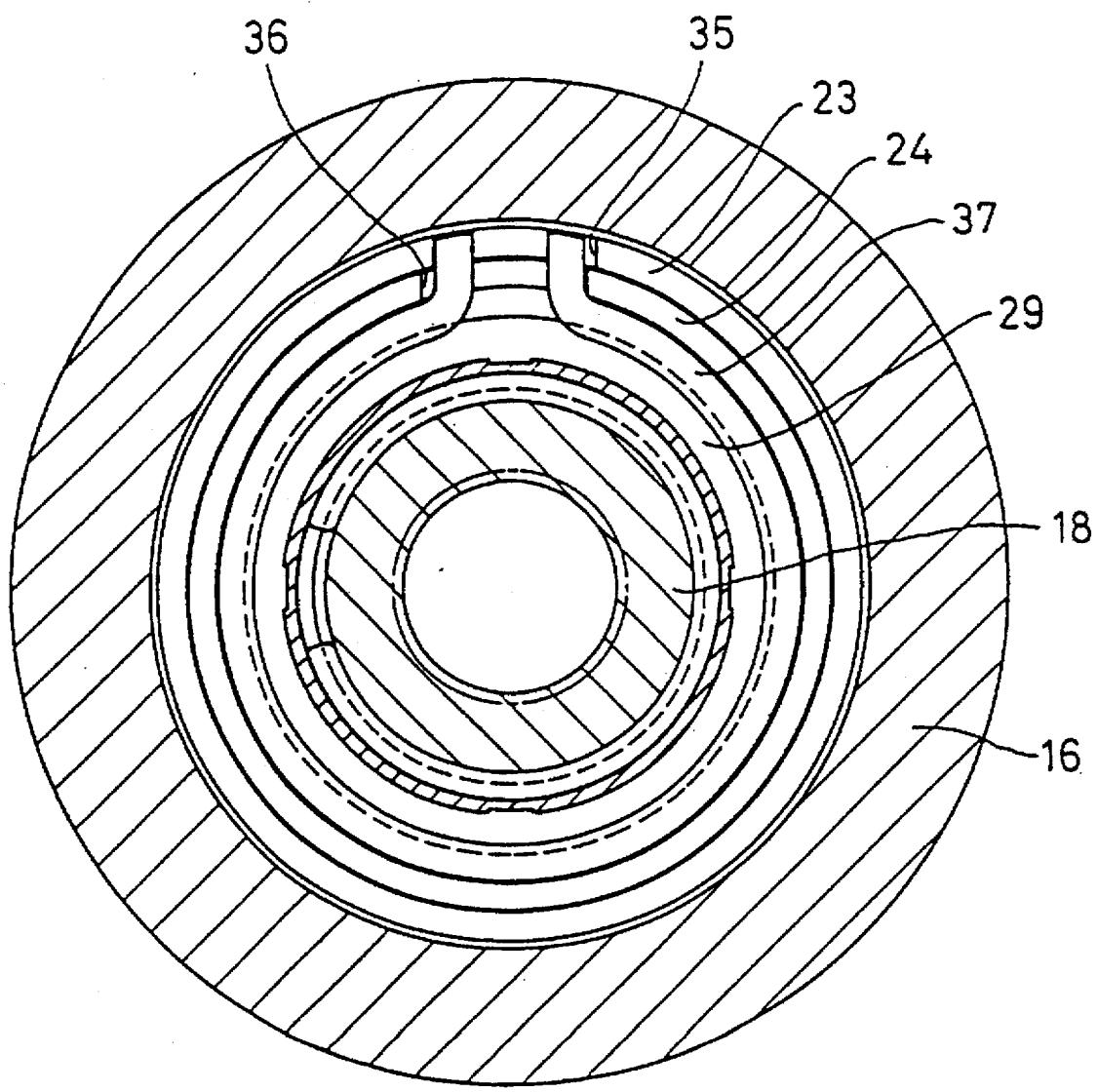
FIG. 8 is a sectional view taken along arrow VIII—VIII of FIG. 4.

The large-diameter cage 23 and the small-diameter cage 24 have diametrical slits 35 and 36 at their respective ends (FIG. 8). A C-shaped switch spring 37 has its both ends engaged in the slits 35 and 36. It is set in a circumferentially compressed state, so that its one end is pressed against the large-diameter cage 23 and the other end against the small-diameter cage 24. Thus, the large-diameter cage 23 is turned in one direction, biased by the switch spring 37, so that the sprags 32 are inclined in one direction to a stand-by position where they are ready to come into wedging engagement. Thus, the switch spring 37 serves as a biasing means for imparting to the large-diameter cage 23 a turning force in one direction.

A locking means 38 is coupled to the rear end of the arm 25 of the large-diameter cage 23. It selectively couples the large-diameter cage 23 to the outer ring 16.

As shown in FIGS. 3–6, the locking means 38 comprises an annular member 39 press-fitted in the outer ring 16 and formed with spline-like recesses 45 in its inner periphery, and a plurality of cutouts 40 formed in the arm 25 of the large-diameter cage 23.

An annular coupling member 42 is fixedly mounted on one end of a cylindrical slider 41 rotatably and axially slidably mounted around the axle portion 12a.

The coupling member 42 has on its outer periphery a plurality of protrusions 43 (FIG. 6) extending axially forwardly and fitting in the cutouts 40 formed in the arm 25 of the large-diameter cage 23. The coupling member 42 thus rotates with the large-diameter cage 23.

Figure 6:
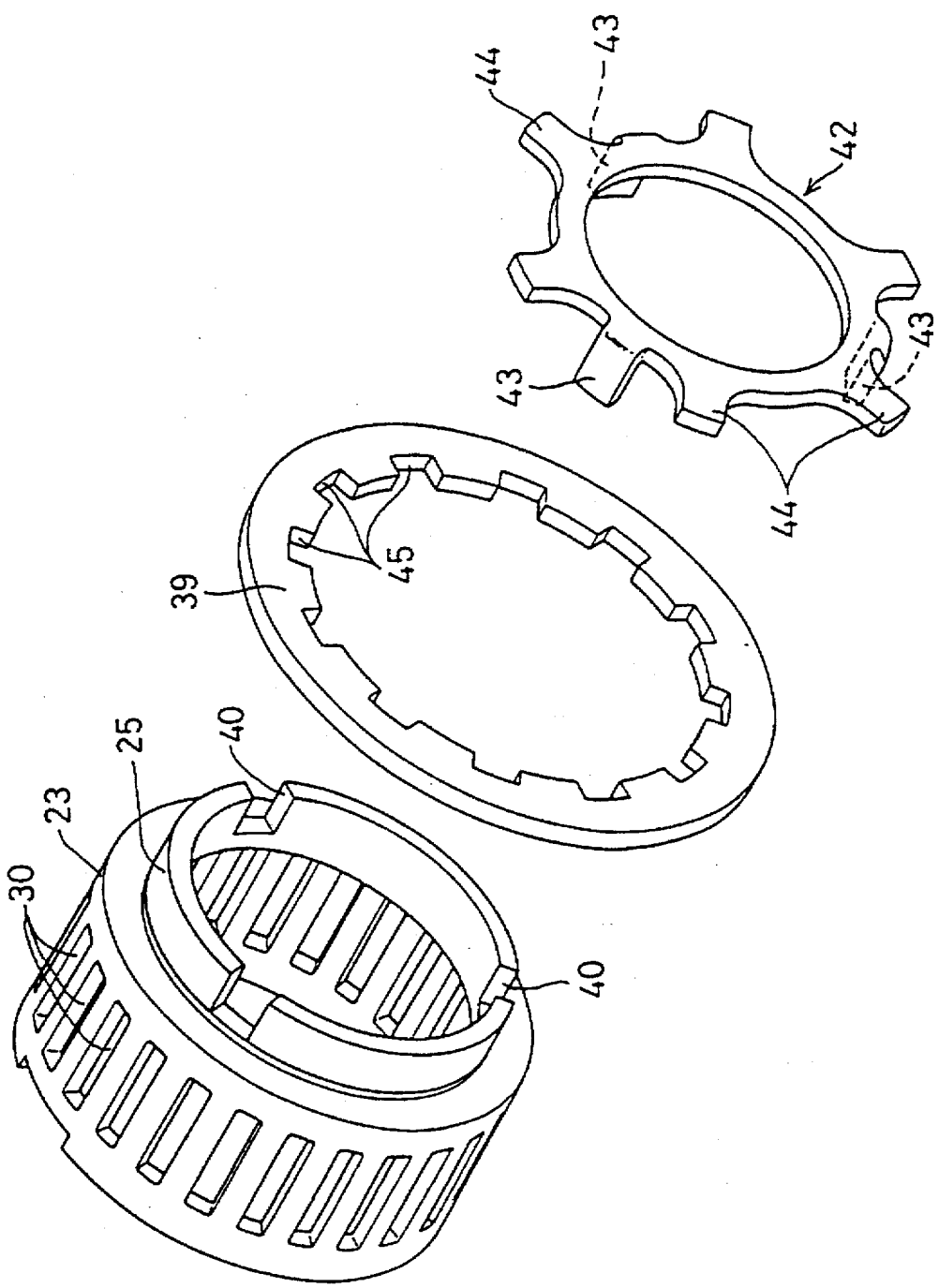
FIG. 6 is a partial exploded perspective view of the locking means.

The coupling member 42 also has a plurality of protrusions 44 extending radially outwardly from its outer circumference. When the slider 41 is in its advanced position where it is close to the inner ring 18 as shown in FIGS. 5B and 6, the protrusions 44 mesh with the recesses 45 of the annular member 39. The large-diameter cage 23 is thus coupled to and rotatable with the outer ring 16.

When the slider 41 is in its retracted position where it is apart from the inner ring 18 as shown in FIG. 5A, the protrusions 44 of the coupling member 42 are not in engagement with the recesses 45 of the annular member 39. The large-diameter cage 23 and the outer ring 16 are now rotatable independently of each other.

A control fork 46 (FIG. 4) is connected to the slider 41. It is coupled to an actuator connected to the transfer 8 shown in FIG. 1. Thus, the slider 41 can be moved axially between a position where the coupling member 42 and the annular member 39 are in engagement and a position where they are not in engagement through the control of the transfer 8.

Figure 11:
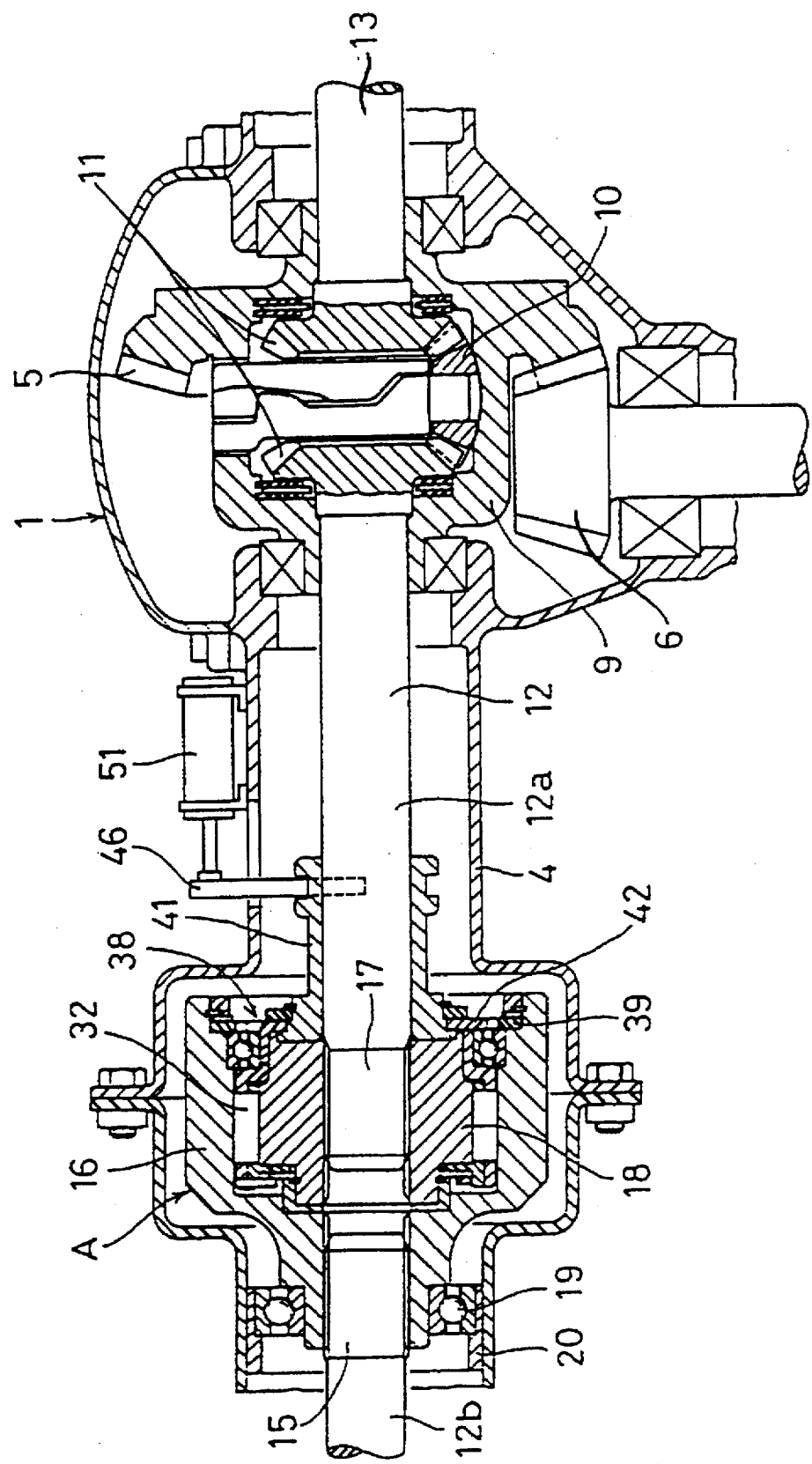
FIG. 11 is a vertical sectional view of a different locking means.

In the embodiment shown in FIG. 11, the slider 41 is moved axially by an air or hydraulic cylinder 51 mounted on the differential cover 4. Otherwise, the slider 41 may be moved by a solenoid.

In the embodiment shown in FIGS. 12A and 12B, the coupling member 42 is fixedly mounted on a disk-shaped slider 41a axially slidably mounted on the axle portion 12a. The slider 41a is keyed to a fixed case 62 fixed to the differential cover 4 so that it cannot rotate though axially movable. A return spring 63 is mounted therebetween in a compressed state to bias the slider 41a toward the inner ring 18. The slider 41a is coupled through a wire cable 61 to an actuator connected to the transfer.

By pulling the wire cable 61, the slider 41a will move toward the fixed case 62 while compressing the return spring 63 as shown in FIG. 12A. The protrusions 44 of the coupling member 42 will separate from the annular member 39, disengaging the large-diameter cage 23 from the outer ring 16. By releasing the wire cable 61 in this state, the slider 41a and the coupling member 42 will be pushed by return spring 63 toward the inner ring 18 until the protrusions 44 of the coupling member 42 engage the annular member 39. The outer ring 16 and the large-diameter cage 23 will thus engage together again so that they rotate in unison.

Now in operation, during a two-wheel drive mode, the coupling member 42 is disengaged from the annular member 39 by retracting the slider 41 as shown in FIG. 5A so that the outer ring 16 and the large-diameter cage 23 can rotate independently of each other.

When the car is moved forward in this state, the large-diameter cage 23, biased by the switch spring 37, rotates in one direction relative to the inner ring 18, so that the sprags 32 are inclined in one direction to a stand-by position where they are ready to engage (FIG. 9).

While the outer ring 16 is driven to rotate faster than the axle portion 12a with the sprags 32 in such a stand-by position, the sprags 32 will not engage, so that the outer ring 16 is allowed to run free. The axle portion 12b and the axle 13 are rotated by the front wheels in the same direction. The axle portion 12a is rotated by the axle 13 through the differential in the opposite direction. Since no driving force is transmitted from the engine to the front wheel axles, the ring gear 5, pinion gear 6 and the propeller shaft connecting the differential to the transfer do not rotate.

Thus, the car equipped with the clutch device of the present invention is comparable in its noise level and fuel consumption to part-time four-wheel drive vehicles equipped with conventional manual or automatic free-wheel hubs.

In order to drive the car in a four-wheel drive mode on a road with a low friction coefficient such as a snow-covered road, the coupling member 42 is brought into engagement with the annular member 39 by advancing the slider 41 as shown in FIG. 5B.

Now the outer ring 16 and the large-diameter cage 23 are thus locked together. Namely, the latter rotates in the same direction as the former. The sprags 32 will instantly move from the position shown in FIG. 9 to the position shown in FIG. 10, interlocking the outer ring 16 and the inner ring 18 by engaging both the cylindrical surfaces 21 and 22 of the outer ring 16 and the inner ring 18. The car is now driven in a four-wheel drive mode with the outer ring 16 coupled to the axle portion 12a.

In order to change the drive mode from two-wheel to four-wheel drive, there is no need to back up the car. Once switched to the four-wheel drive mode, this mode is maintained even if the car is backed up and then moved forward in an attempt to get out of a rough road. Thus, it is possible to achieve a high driving capability.

Even if the car gets stuck while climbing a long slope with a low friction coefficient in a two-wheel drive mode, it is possible to change the drive mode instantly to four-wheel drive with no time lag and restart the car smoothly.

In order to drive the car in a four-wheel drive mode on a road with a high friction coefficient such as a paved road, the outer ring 16 is disengaged from the large-diameter cage 23 by retracting the slider 41 as shown in FIG. 5A.

In this state, while the car is moving forward, two-wheel drive and four-wheel drive modes will change over automatically according to the relative rotational speed between the driving member and the driven member.

Namely, while the car is turning a corner and thus the front wheels are rotating faster than the rear wheels, the outer ring 16 coupled to the front wheels rotates faster than the inner ring 18, so that the sprags 32 disengage, allowing the outer ring 16 to run free. As a result, the front wheels and the rear wheels can rotate separately from each other. Thus, no braking force will act on the vehicle while turning a tight corner.

The clutch device of this embodiment can thus cope with various road conditions. The part-time four wheel drive car equipped with this clutch device can be driven as stably as a full-time four wheel drive car.

Next, the third embodiment will be described with reference to FIGS. 13–20.

Figure 13:
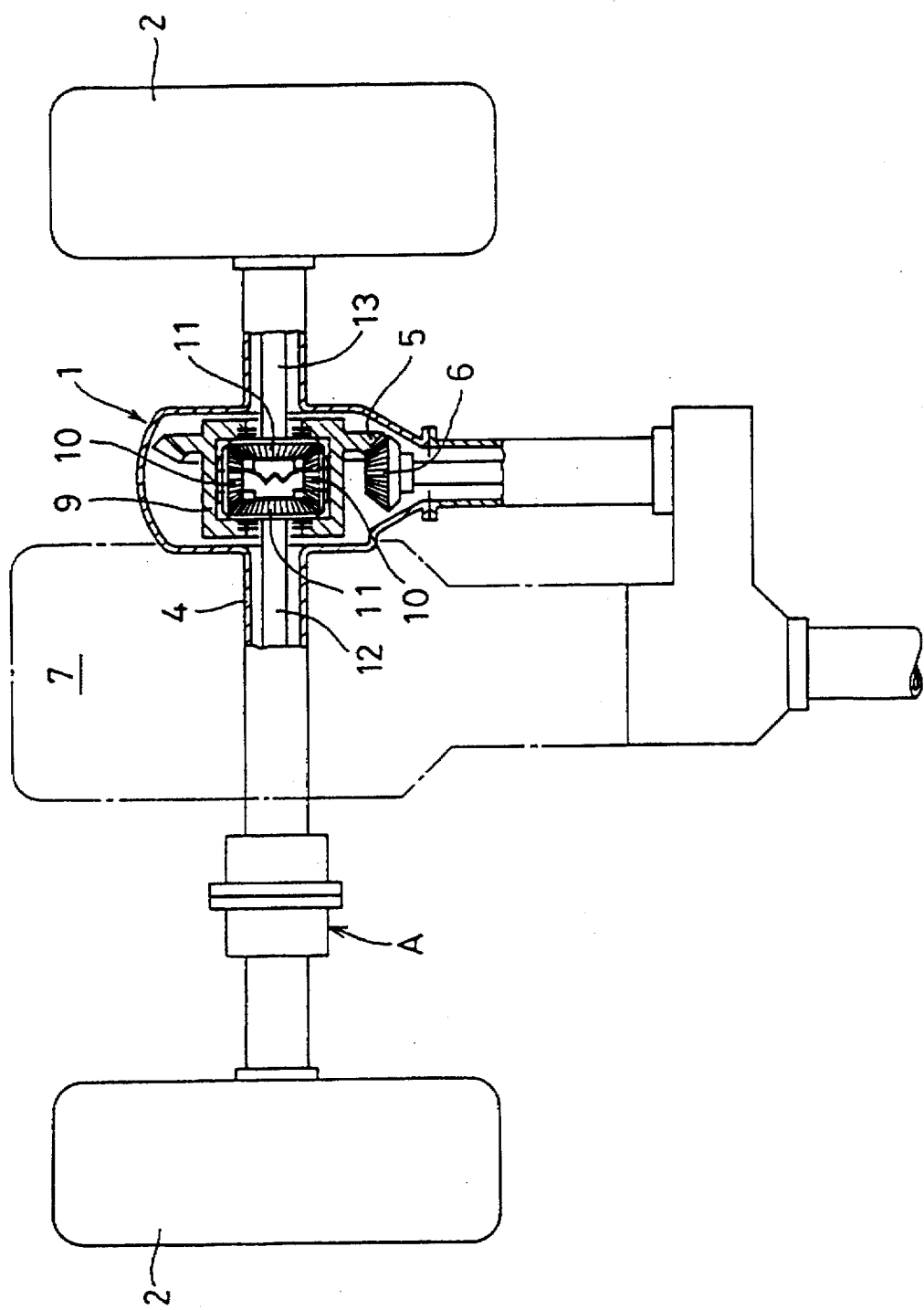
FIG. 13 is a view partly in section showing a power transmission device of a third embodiment mounted on a 4-wheel vehicle.

FIG. 13 shows a power train of a four-wheel drive vehicle of a type driven mainly by the rear wheels. In the figure, numeral 1 designates a front differential and numeral 2 the front wheels.

The front differential 1 comprises a differential case 9 rotatably mounted in a differential cover 4 and coupled to an engine 7 through a ring gear 5 and a drive pinion and through a transfer 8. Pinion gears 10 are coupled, to be rotatable, with the differential case 9 and a pair of side gears 11 which mesh with the pinion gears 10. Front wheel driving axles 12 and 13 are connected to the respective side gears 11.

Figure 14:
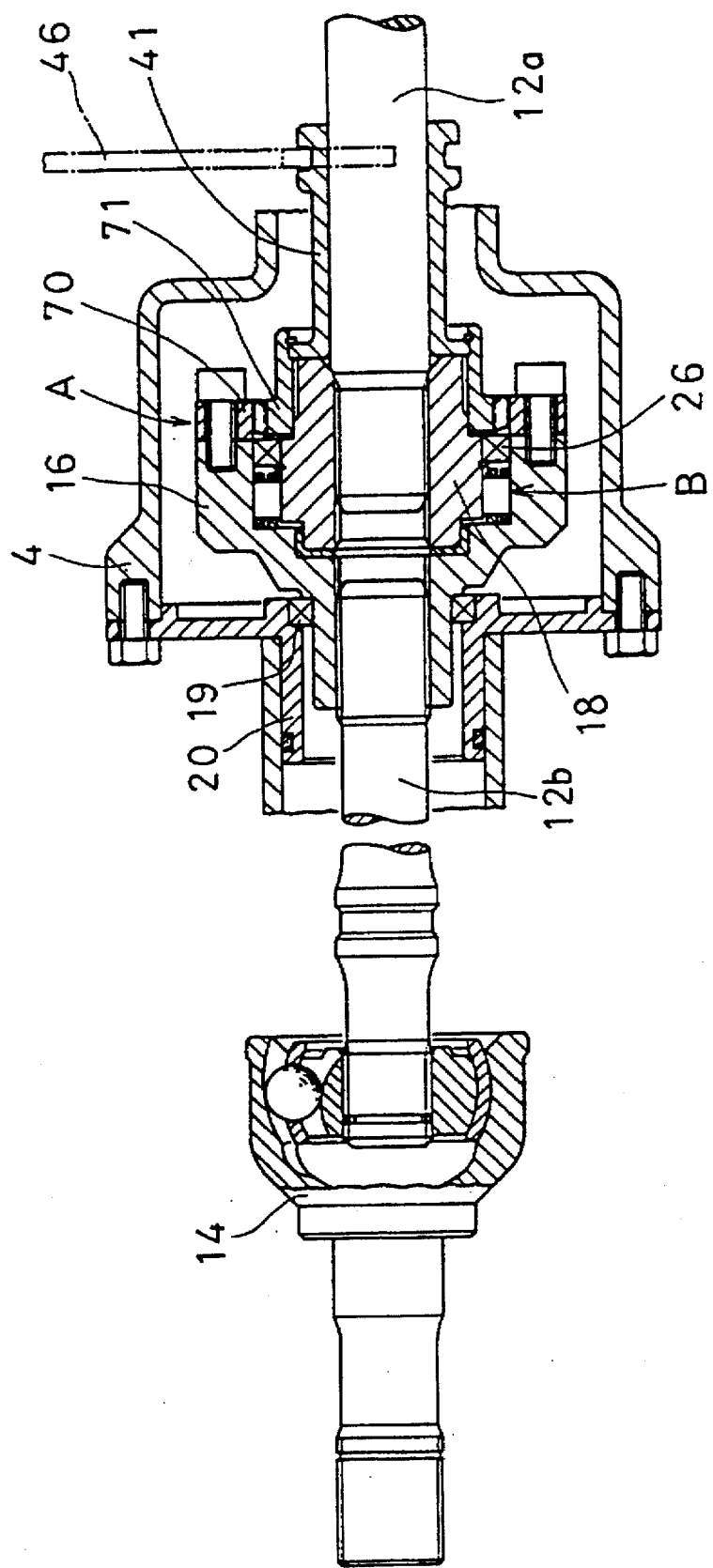
FIG. 14 is a vertical sectional view of the same.

The shorter axle 12b is coupled to one of the front vehicle wheels 2 through a homokinetic joint 14 (FIG. 14).

The longer axle 12a and the differential cover 4 through which the axle 13 extends are axially split into two portions. A power transmission device A is mounted between the two split portions of the axle 12 and the differential cover 4.

Figure 15:
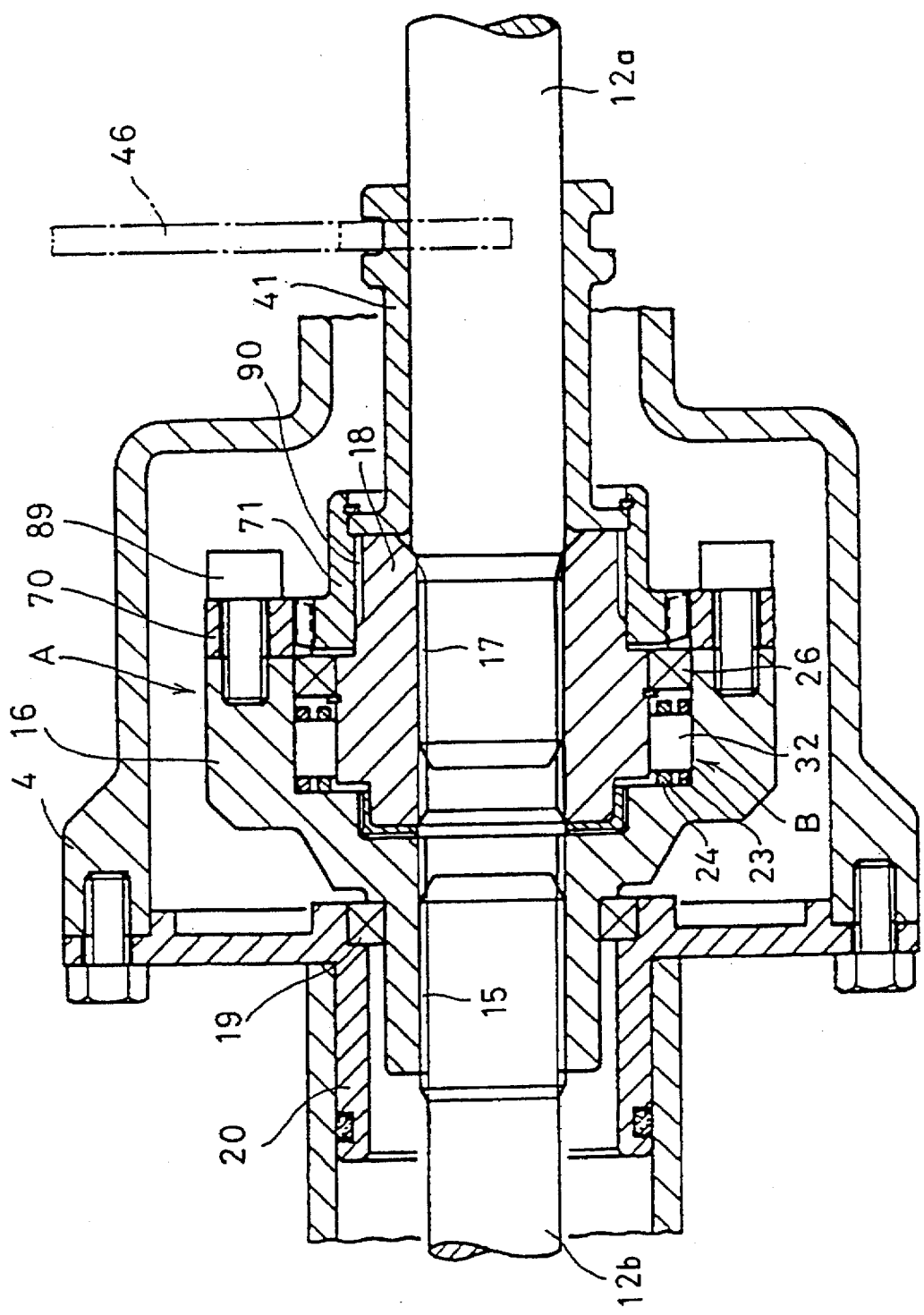
FIG. 15 is an enlarged sectional view of a part of the same.

As shown in FIGS. 14 and 15, the power transmission device A comprises an outer ring 16 coupled through a spline 15 to the axle portion 12b which is connected to the other front wheel. Also provided is an inner ring 18 coupled through a spline 17 to the axle portion 12a which is connected to the differential. The outer ring 16 is rotatably mounted on the differential cover 4 by means of a bearing 19 and a sleeve 20.

The outer ring 16 and the inner ring 18 are mounted through a bearing 26 so as to be rotatable relative to each other. A one-way clutch B is mounted inside the bearing 26.

Figure 19:
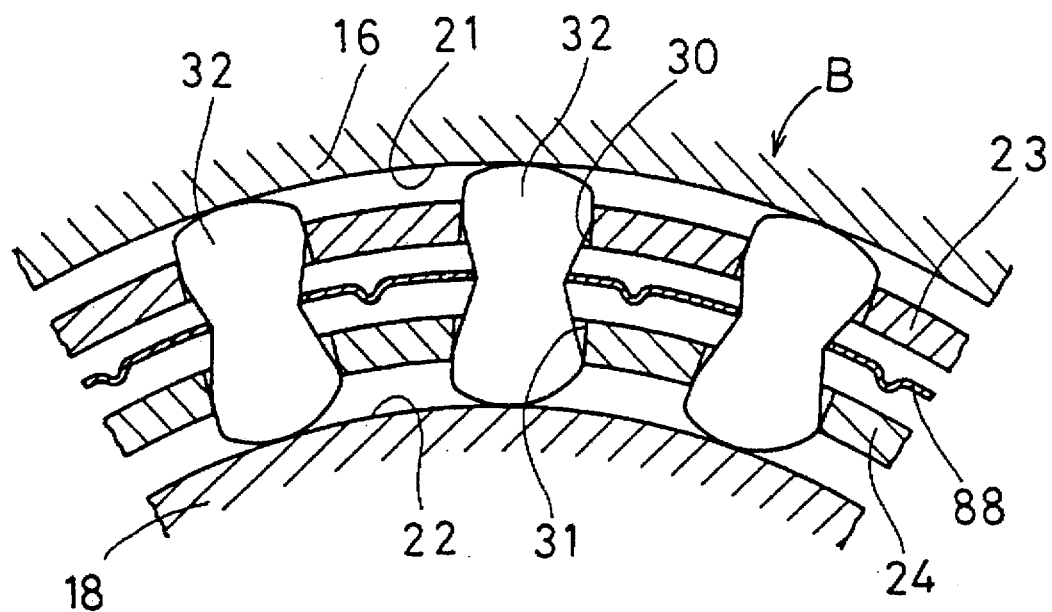
FIG. 19 is a vertical sectional view of the one-way clutch.
Figure 20:
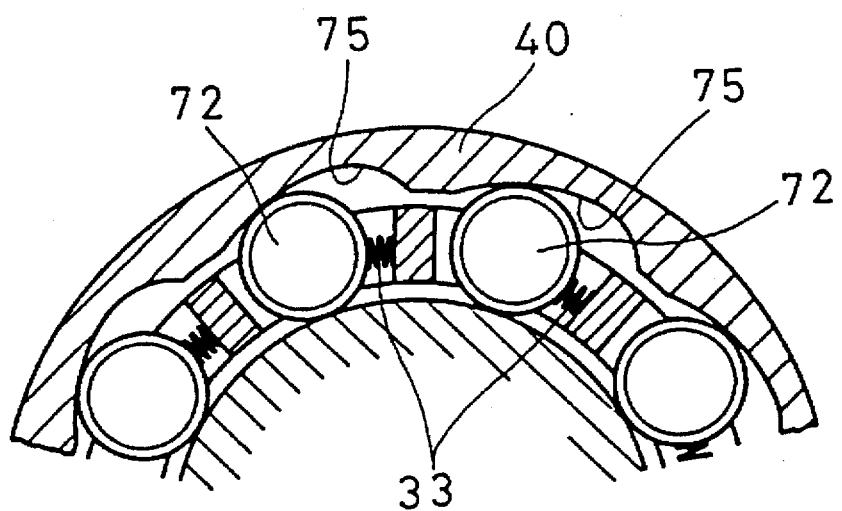
FIG. 20 is a similar view of another example of the one-way clutch.

As shown in FIG. 19, the one-way clutch B comprises annular cages 23 and 24 having different diameters and mounted between opposite cylindrical surfaces 21 and 22 formed on the outer ring 16 and the inner ring 18, respectively. The sprags 32 are received in pockets 30 and 31 formed in the cages 23 and 24, respectively. The sprags 32 are always biased by a ribbon spring 88 to incline in one direction.

While the inner ring 18 (and the axle portion 2a connected to the differential) is rotating faster than the outer ring 16 (and the axle portion 12b connected to the wheel), the sprags 32 are inclined and engage the cylindrical surfaces 21 and 22. Torque is thus transmitted. While the outer ring 16 is rotating faster than the inner ring 18, the outer ring is allowed to run free (overrun) relative to the sprags 32, so that no torque is transmitted. In this embodiment, the one-way clutch B is arranged to get locked while the vehicle is traveling forward.

As shown in FIG. 15, an outer gear 70 is fixed by bolts 89 to one end of the outer ring 16. The inner ring 18 is formed with splines 90 on its outer periphery. An inner gear 71 axially meshes with the splines 90.

Figure 17A:
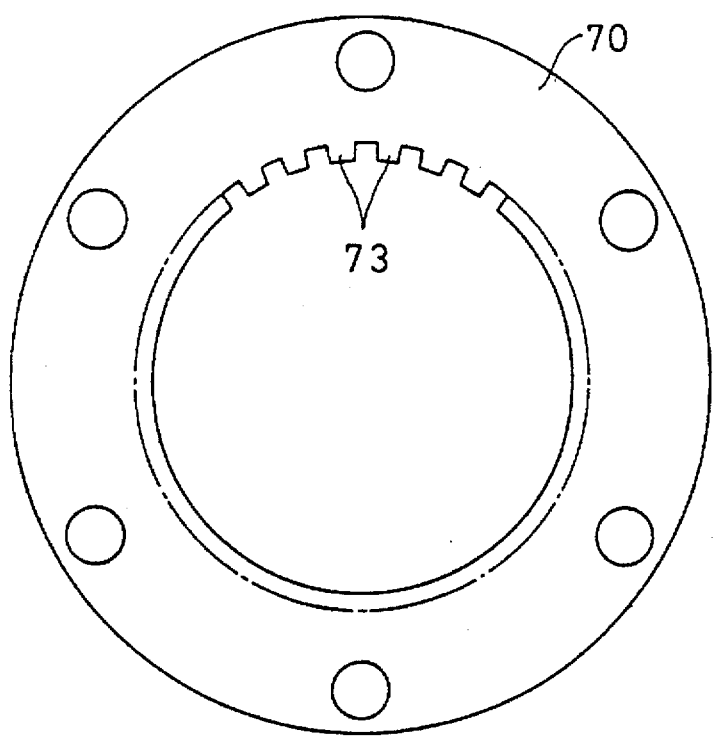
FIG. 17A is a front view of the outer gear.
Figure 17B:
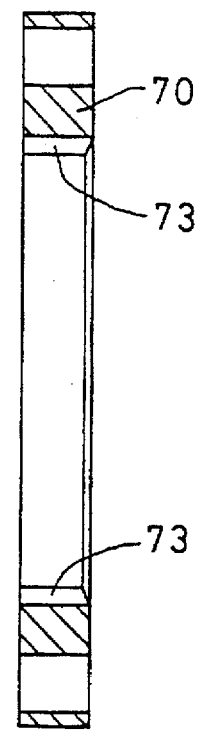
FIG. 17B is a vertical sectional side view of the same.
Figure 18A:
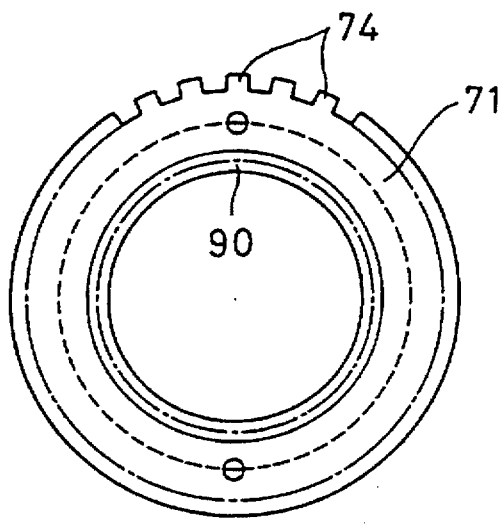
FIG. 18A is a front view of the inner gear.
Figure 18B:
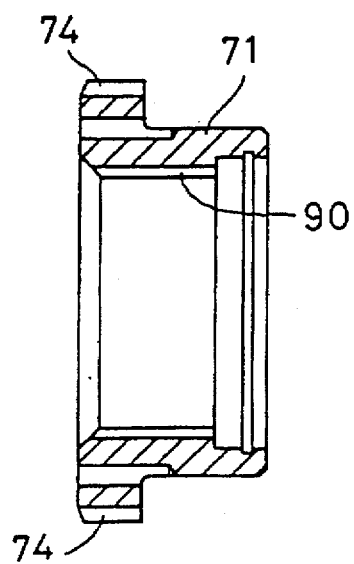
FIG. 18B is a vertical sectional side view of the same.

As shown in FIGS. 17 and 18, the outer gear 70 and the inner gear 71 have the same number of teeth 73 and 74 on their inner and outer peripheral surfaces, respectively. By moving the inner gear 71 toward the outer gear 70 until their respective teeth 73 and 74 mesh with each other, the inner ring 18 and the outer ring 16 (and thus the axle portion 12a connected to the differential and the axle portion 12b connected to the wheel) are locked together.

A slider 41, axially and slidably mounted on the axle portion 12a is coupled to one end of the inner gear 71 (FIG. 15). A control fork 46 is fixed to the slider 41. While not shown, the control fork 46 is coupled to an actuator connected to a transfer of the vehicle. Thus, by controlling the transfer, the slider 41 can be axially moved so that the inner gear 71 is moved into and out of engagement with the outer gear 70.

In operation, for the two-wheel drive mode, the inner gear 71 is separated from the outer gear 70 by moving the slider 41 away from the inner ring 18 as shown in FIG. 16A. In this state, the one-way clutch B is allowed to run free, so that the axle portions 12a and 12b are completely separated from each other. Namely, no torque is transmitted from the front wheels 2 to the front differential 1. In this state, since the axle 13 is being rotated by the front wheel 2, the side gear 11 of the front differential 1 connected to the axle 13 is rotated. But since the axle portion 12a is under no load, the rotation of the side gear 11 is not transmitted to the differential case 9. The pinion gears 10 turn about their axes. Since the differential case 9 is not rotated, the ring gear 5, the drive pinion 6 and the front propeller shaft extending to the transfer are not rotated, either.

For the four-wheel drive mode, the inner gear 71 is brought into meshing engagement with the outer gear 70 by moving the slider 41 toward the inner ring 16 by remote control as shown in FIG. 16B. The front differential 1 is now connected to both front wheels 2. Namely, all four wheels are driven by the engine. Also, in this state, engine brakes are applied from all four wheels.

To change from two-wheel drive mode to four-wheel drive mode while the vehicle is at a stop or traveling at a low speed (which is necessary if e.g. the rear wheels begin to slip on a road with low μ), the inner gear 71 has to be brought into meshing engagement with the outer gear 70. If this is tried while the rear wheels are slipping, they may violently collide with each other due to the rotating speed difference therebetween (the inner gear, connected to the front differential 1, is rotating faster than the outer gear). Thus, the gears may be damaged.

In the embodiment, the one-way clutch B prevents the axle portion 12a connected to the differential from rotating faster than the axle portion 12b connected to the wheel, so that the outer gear 70 and the inner gear 71 are always rotated substantantially synchronized with each other. Thus, the gears can be smoothly meshed together.

The one-way clutch B is not limited to the one shown but may be of any other type as far as it can lock when rotated in one direction and run free when rotated in the opposite direction. For example, the one-way clutch shown in FIG. 20 may be used. This clutch comprises rollers 72 mounted between inclined cam surfaces 75 formed on a clutch outer ring 16, an inner ring 18, and springs 33 biasing the rollers 72 against the cam surfaces 75.

FIGS. 21A and 21B show the fourth embodiment.

In this embodiment, the inner gear 71 is formed integral with the remote-controlled slider 41 as an engaging member 81. This engaging member 81 is axially and movably mounted on the axle portion 12a through a spline 17. Otherwise, this embodiment is the same both structurally and functionally as the first embodiment.

Figure 22A:
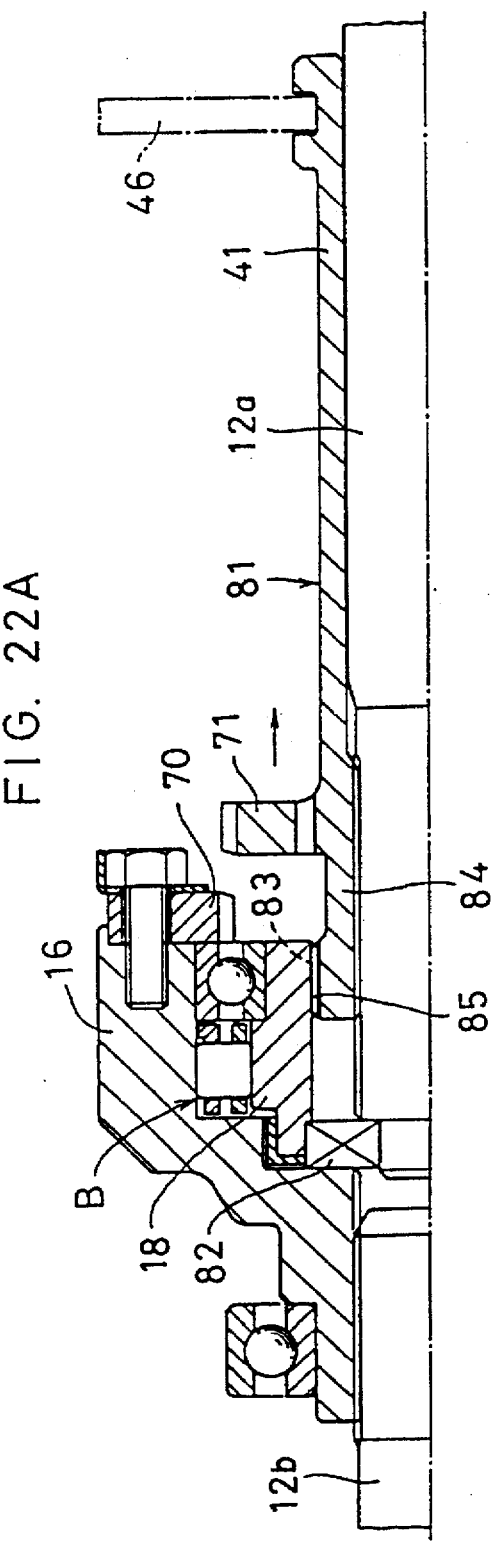
FIGS. 22A and 22B are similar views of a fifth embodiment.
Figure 22B:
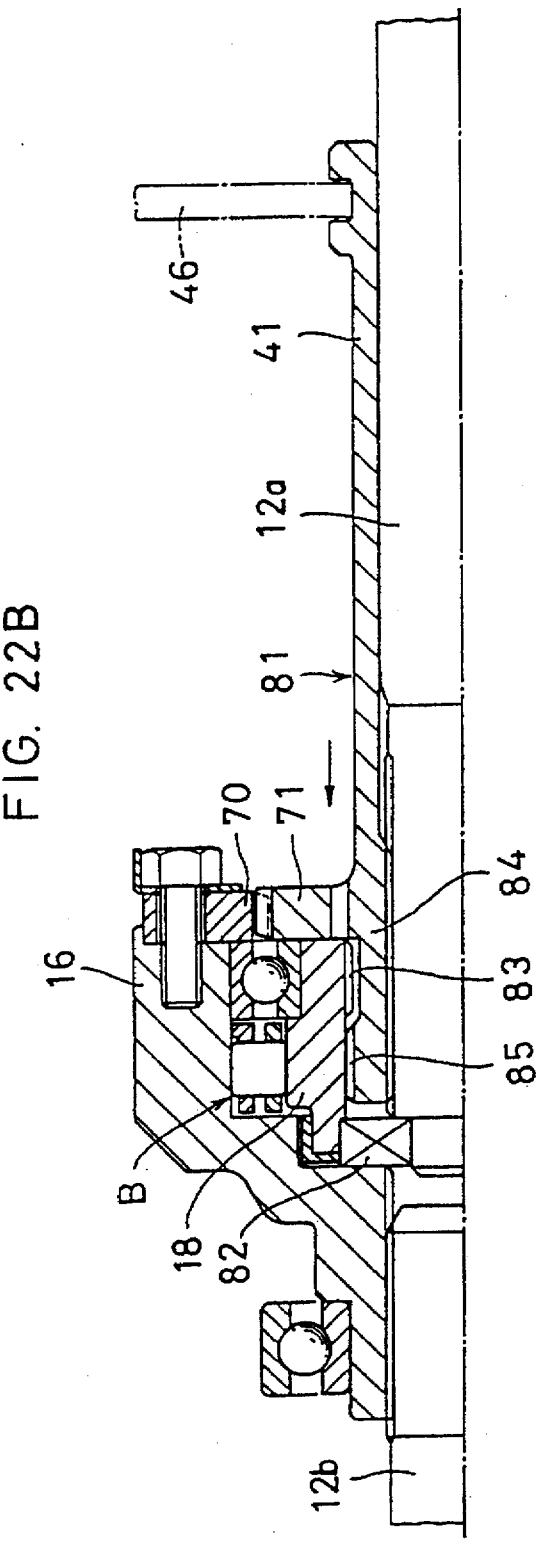

In the fifth embodiment shown in FIGS. 22A and 22B, the inner ring 18 is rotatably mounted on the axle portion 12b through a metal axle 82. A spline 83 is formed on the inner periphery of the inner ring 18 near its one end. The engaging member 81 has an extension 84 received in the inner ring 18 and formed with a spline 85. The splines 83 and 85 of the inner ring 18 and the engaging member 81 mesh with each other while the outer gear 70 and the inner gear 71 are separate from each other as shown in FIG. 22A. The splines 83 and 85 are separated from each other when the outer gear 70 and the inner gear 71 mesh completely with each other as shown in FIG. 22B.

By changing over the transfer from two-wheel drive to four-wheel drive mode, the splines 83 and 85 engage as shown in FIG. 22A. Torque is thus transmitted through the one-way clutch B. The engaging member 86 is then gradually moved leftward, as shown until the outer gear 70 meshes completely with the inner gear 71 as shown in FIG. 22B. In this state, the splines 83 and 85 disengage from each other, so that torque is transmitted directly between the outer gear 70 and the inner gear 71, while no torque is transmitted through the one-way clutch B.

What is claimed is:

1. A power transmission device comprising:

an axle having axially separated first and second axle portions;

said first axle portion having a first end coupled to a differential and a second end coupled to a clutch;

said second axle portion having a clutch end coupled to said clutch and an other end axially distanced from said clutch;

said clutch comprising a driving member coupled to said first axle portion and a driven member coupled to said second axle portion;

said clutch transmitting a torque when said first axle portion rotates faster than said second axle portion;

said clutch permitting free rotation of said first and second axle portions when said first axle portion is not rotating faster than said second axle portion;

an engaging member mounted between said first and second axle portions for selectively transmitting said torque between said first and second axle portions;

said engaging member comprising a gear mounted to each of said first and second axle portions, wherein said gears are axially movable into and out of meshing engagement with each other;

one of said driving and driven members being an outer ring and the other of said driving and driven members being an inner ring, wherein said inner ring is provided inside said outer ring;

one of said gears being an outer gear mounted on said outer ring, and the other of said gears being an inner gear coupled to said inner ring or the axle portion to which said inner ring is coupled;

said inner gear being axially movable into and out of meshing engagement with said outer gear;

said inner ring being rotatably coupled to said other of said first and second axle portions, wherein said inner gear is coupled to the axle portion to which said inner ring is coupled; and said inner ring and said inner gear being provided with splines adapted to engage while said inner gear and said outer gear are not in mesh with each other and disengage while said inner gear and said outer gear are in mesh.

2. A power transmission device, as claimed in claim 1, wherein said power transmission device is housed in a differential cover.

3. A power transmission device, as claimed in claim 1, further including a remote control means for remote controlling a coupling between said driving member and said driven member.

4. A power transmission device comprising:

an axle having axially separated first and second axle portions;

said first axle portion having a first end coupled to a differential and a second end coupled to a clutch;

said second axle portion having a clutch end coupled to said clutch and an other end axially distanced from said clutch;

said clutch comprising a driving member coupled to said first axle portion and a driven member coupled to said second axle portion;

a plurality of sprags mounted between said driving member and said driven member and adapted to engage both said driving and driven members when said driving and driven members are rotated relative to each other;

a cage mounted between said driving member and said driven member to rotate relative to said driving member to move said sprags to a stand-by position wherein said sprags are ready to engage said driving and driven members; and a biasing means coupled to said cage for biasing and rotating said cage in one direction to move said sprags to said stand-by position;

wherein said clutch further comprises an externally controlled locking means for detachably coupling said cage and said driven member together.

5. A power transmission device, as claimed in claim 4, wherein said locking means comprises:

an engaging member provided on one of said cage and said driven member;

an axially movable slider mounted on said axle;

a coupling member fixedly mounted on said slider and engaged with the other of said cage and said driven member so as to be movable into and out of engagement with said engaging member; and a control fork coupled to said slider wherein said slider is axially movable by applying a force to said control fork.

6. A power transmission device, as claimed in claim 4, wherein said locking means comprises:

an engaging member provided on one of said cage and said driven member;

an axially movable slider mounted on said axle;

a coupling member fixedly mounted on said slider and engaged with the other of said cage and said driven member so as to be movable into and out of engagement with said engaging member; and a pressure fluid driving means coupled to said slider for axially moving said slider.

7. A power transmission device, as claimed in claim 4, wherein said locking means comprises:

an engaging member provided on one of said cage and said driven member;

a coupling member engaged with the other of said cage and said driven member so as to be movable into and out of engagement with said engaging member;

a wire cable connected to said coupling member; and a control member for converting a force applied to said wire cable to a force for moving said coupling member into and out of engagement with said engaging member.

* * * * *